United States Patent [19]

Adar

[11] Patent Number: 5,495,224
[45] Date of Patent: Feb. 27, 1996

[54] METHOD AND APPARATUS FOR PREVENTING AUTO THEFT

[76] Inventor: Uriel Adar, 10 Cornell St., Scarsdale, N.Y. 10583

[21] Appl. No.: 177,591

[22] Filed: Jan. 5, 1994

[51] Int. Cl.⁶ .............................. B60R 25/10; B60J 1/00
[52] U.S. Cl. ...................... 340/426; 340/425.5; 340/429; 307/10.2; 116/67 R; 296/84.1; 362/80.1
[58] Field of Search ................................ 340/426, 425.5, 340/428, 429; 116/211, 214, 67 R; 307/10.2; 296/84.1, 97.1, 97.4; 362/80.1

[56] References Cited

U.S. PATENT DOCUMENTS

| | | | |
|---|---|---|---|
| 1,237,104 | 8/1917 | Schumacher | 296/84.1 |
| 4,958,142 | 9/1990 | Sayers | 340/426 |
| 5,182,541 | 1/1993 | Bajorek et al. | 340/428 |

FOREIGN PATENT DOCUMENTS

| | | | |
|---|---|---|---|
| 2205251 | 8/1973 | Germany | 340/426 |

*Primary Examiner*—Donnie L. Crosland
*Attorney, Agent, or Firm*—Nims, Howes, Collison, Hansen & Lackert

[57] ABSTRACT

A method and apparatus for preventing automobile theft which includes structure for rendering the front windshield, or all the windows of the automobile, opaque. The opaqueness may be caused either by mechanical means, or alternatively, by utilizing liquid crystals or similar media, energized by electric fields.

10 Claims, 2 Drawing Sheets

METHOD AND APPARATUS FOR PREVENTING AUTO THEFT

BACKGROUND OF THE INVENTION

1. Field of the Invention

The present invention relates to a method and apparatus for the prevention of automobile theft. In particular, the present invention relates to a method to discourage theft of an automobile having a front windshield, which method comprises:

providing said automobile with at least one detection mechanism having at least one detection sensor, each said detection mechanism activatable by unauthorized or forced entry to the automobile;

providing said automobile with means to render the front windshield of said automobile opaque, said means activatable by said detection mechanism;

wherein activation of said detection mechanism by forced or unauthorized entry, will activate said means and render the windshield opaque, effectively preventing operation of said automobile.

Further, the present invention relates to an apparatus to discourage theft of an automobile having a front windshield, which apparatus comprises:

at least one detection mechanism having at least one detection sensor, each said detection mechanism activatable by unauthorized or forced entry to the automobile;

means to render the front windshield of said automobile opaque, said means activatable by said detection mechanism;

wherein activation of said detection mechanism by forced or unauthorized entry, will activate said means and render the windshield opaque, effectively preventing operation of said automobile.

2. Description of Related Art

Many methods have been devised to prevent or discourage automobile theft. The most common type heretofore available employed an audible alarm which would be triggered by the opening of doors or windows, or by the completion of the ignition circuitry, when the vehicle is started. Many variations of this type of alarm system have been developed over many years with increasing sophistication.

Many now have added warning features such as flashing headlights and additional activation modes such as attempted opening of car windows, hood or trunk and even by mere contact or proximity to the vehicle. These audible alarm systems have many disadvantages. Firstly, the theft of the vehicle is not prevented, since it can be driven to some location where the device can be easily deactivated. Since the alarm is audible, its location is easily determined and silenced by disconnection from its power source or by mechanically destroying it.

As is well known, these audible devices are prone to accidental activation causing considerable disturbance, especially at night, diverting law enforcement resources, and are often subject to penalties. They cannot even be tested without causing a disturbance and consequently are frequently not tested, so that a malfunction would go unnoticed, allowing theft of the vehicle without warning.

Other types of anti-theft systems do not provide audible warning, but prevent the ignition from being connected or the starter solenoid from being activated. These are largely obsolete because, since they do not cause a disturbance, they allow a potential car thief to work unobtrusively to defeat the circuit cut outs, start the vehicle and drive away.

In addition to the electrically activated systems described above, there are a range of purely mechanical means developed over the years to prevent automobile theft. Of course, every vehicle is equipped with simple door locks which are just as simply defeated. All modern vehicles are also equipped with steering wheel locks which lock the steering wheel with a mechanical activator when the ignition is turned off. Experienced car thieves have little difficulty in by-passing the systems by punching out the ignition switch or other destructive means.

Lately, several brute force mechanical method has become popular. One such method is known as "The Club" in which a heavy steel mechanical structure is locked across the steering wheel, severely limiting the motion thereof, and for practical purposes preventing the car from being driven except in a straight line. Like any mechanical system, the locks on this device can be broken or picked and, given time and patience, the device can be sawed off. A common means of by passing these devices is to saw or otherwise cut through the rim of the steering wheel itself, which is almost always of considerably lighter construction than the locking mechanism and consequently much more rapidly severed.

Other mechanical devices have been designed and produced which though not designed to inhibit automobile theft., could be used for that purpose. These are the mechanical devices that are used by parking violation agencies to prevent a vehicle being driven by an owner until the vehicle can be towed or other arrangements made to penalize the owner. As stated, similar devices could be used for anti-theft purposes, but their use and operation would be cumbersome and inconvenient.

Yet another type of system coming into widespread use is known as "Lo-Jack." This system does not specifically prevent the theft of the vehicle, but by planting a transmitter in the vehicle, permits law enforcement agencies to readily track the vehicle and recover it. They rely on the police in the state or local area having invested in the tracking equipment and training in its use. To date, very few agencies have this capacity. In any event, if the vehicle is driven to an area or locality outside the range of such receivers by the time the theft is discovered, the vehicle will probably not be recovered. In many cases, vehicles are stolen for short periods, for "joy riding," and then discarded in often damaged condition and a "Lo-Jack" device can be of little help in this situations.

U.S. Pat. No. 2,011,120 to Searle is entitled BANK AND AUTOMOBILE PROTECTOR. This reference shows a foot operated pressurized chemical tank which can be used to spray would-be robbers with a noxious chemical to repel or a marking chemical to permit subsequent identification.

SUMMARY OF THE INVENTION

It is an object of the present invention to provide a method and apparatus for the protection of an automobile against theft.

It is another object of the present invention to prevent the theft of an automobile by rendering the windshield of the automobile opaque.

The other objects, features and advantages of the present invention will become more apparent in light of the following detailed description of the preferred embodiment thereof.

According to a preferred embodiment of the present invention, there is provided a method to discourage theft of an automobile having a front windshield, which method comprises:

providing said automobile with at least one detection mechanism having at least one detection sensor, each said detection mechanism activatable by unauthorized or forced entry to the automobile;

providing said automobile with means to render the front windshield of said automobile opaque, said means activatable by said detection mechanism;

wherein activation of said detection mechanism by forced or unauthorized entry, will activate said means and render the windshield opaque, effectively preventing operation of said automobile.

According to another embodiment of the present invention, there is provided an apparatus to discourage theft of an automobile having a front windshield, which apparatus comprises:

at least one detection mechanism having at least one detection sensor, each said detection mechanism activatable by unauthorized or forced entry to the automobile;

means to render the front windshield of said automobile opaque, said means activatable by said detection mechanism;

wherein activation of said detection mechanism by forced or unauthorized entry, will activate said means and render the windshield opaque, effectively preventing operation of said automobile.

DETAILED DESCRIPTION OF THE PREFERRED EMBODIMENT

This invention describes a new means to prevent or inhibit auto theft, which does not suffer many of the disadvantages of those systems employed for this purpose heretofore. Further, the present system offers several advantages over the systems of the prior art, and can be constructed and operated in different ways and modes.

Figure 1:
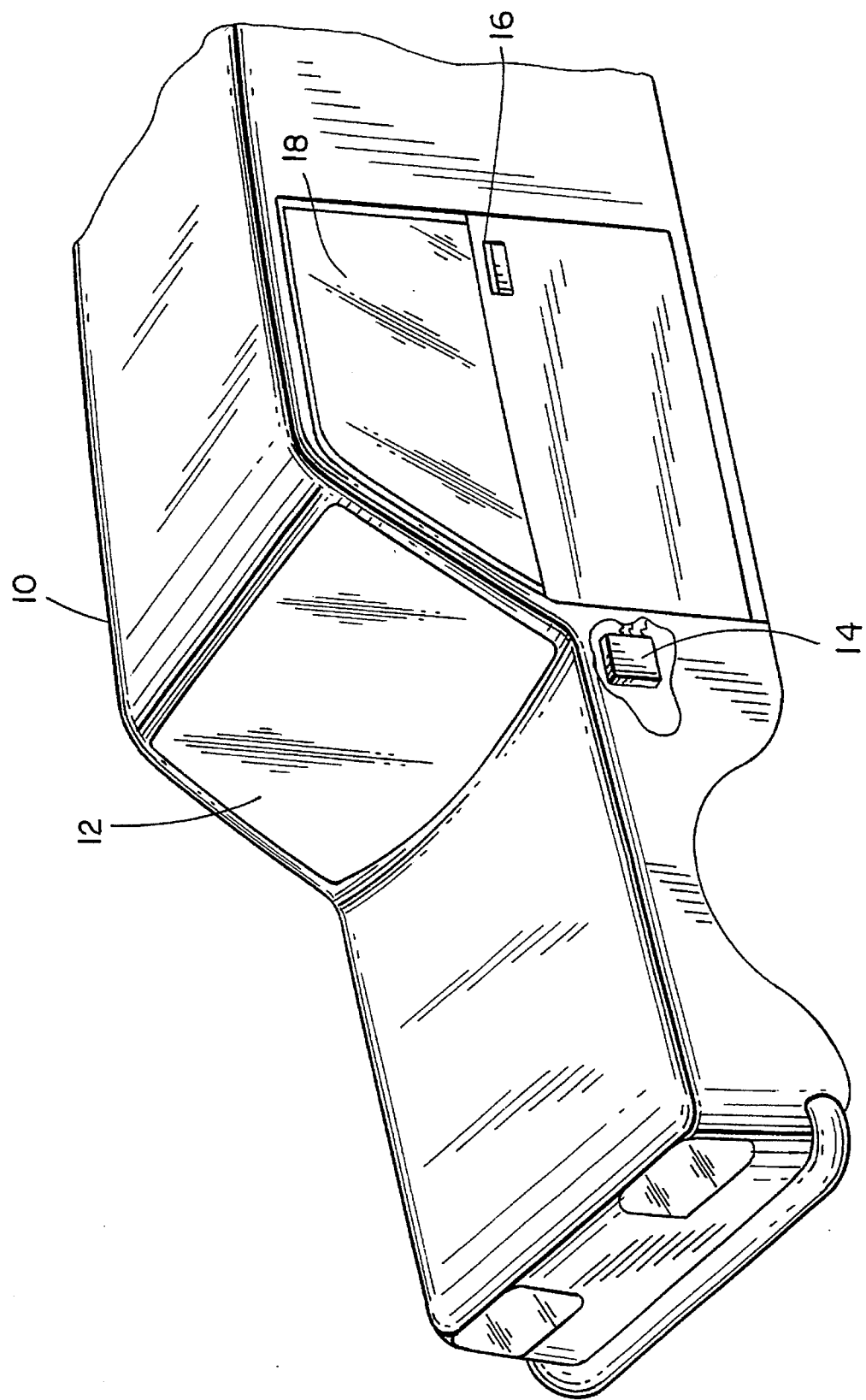
FIG. 1 represents the present invention schematically, as employed upon an automobile.
Figure 2:
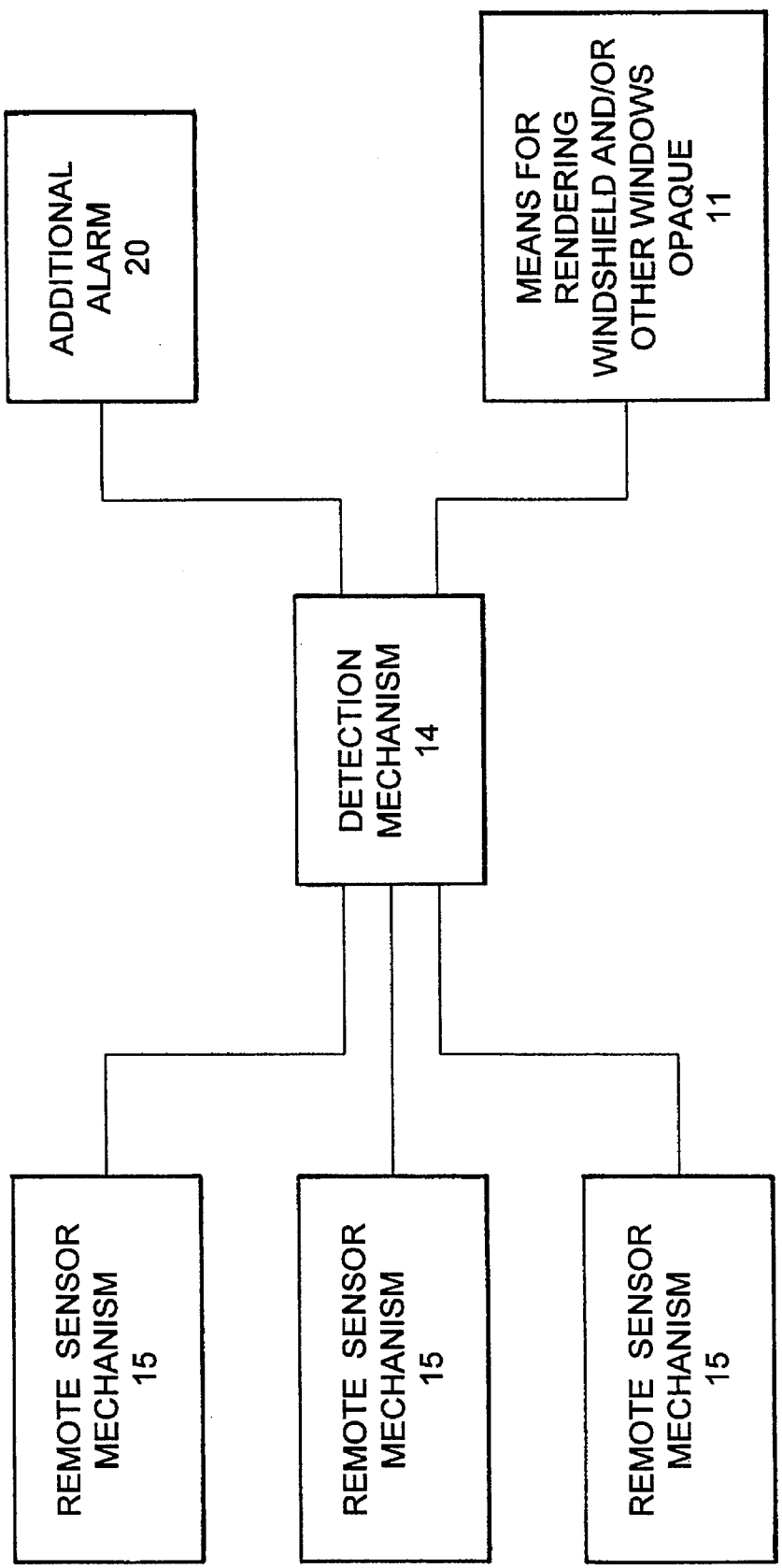
FIG. 2 is schematic which represents the present invention.

As shown in FIG. 1, the invention is integrated into an automobile 10, and includes some means 11 whereby the windshield 12, in particular, but optionally the windshield 12 and any other windows, may be rendered opaque, preventing the driver of the vehicle from seeing where he is going.

Some type of detection mechanism 14, as is known to the art, would be provided with remote sensor mechanisms 15 in the doors 16, windows 18, and ignition circuitry of the automobile 10, as is well known in the art. If one of these remote sensors 15 signals the detection mechanism 14 that there is a forced or unauthorized entry to the automobile 10, the detection mechanism 14 activates means 11 within the windshield 12 which turns the windshield 12 opaque.

This can be accomplished in any of a number of ways using available technology. For example, the windshield 12 might be constructed of two layers of glass in a sandwich construction with a small space between them. Within the space a thin opaque film of mylar, coated mylar, or other thin plastic or metal or metallized plastic film may be drawn by rollers or other mechanical means to blot out the vision through the windshield 12. The rollers or feed mechanism would preferably be activated by electric motors. Alternatively, a series of thin slats might be rotated in the manner of a venetian blind using an electromagnetically driven actuator or other means.

Many non-mechanical means 11 can be employed to render clear glass, plastics and liquids opaque or transparent by direct electrical means. For example, in liquid crystal displays as used in computer displays, watches, calculators, etc., the application of the electric field to certain liquids renders them opaque. A sandwich construction of glass with such liquid and electrode arrays enclosed could be utilized to render the windshield 12 opaque. Techniques also exist for applying electric fields to certain specially formulated glass and plastics which will render them opaque. In the case of plastics, this would require a layer of such plastic on the inside of a regular safety glass windshield 12, since plastics are easily scratched by dust and ,debris when driving at high speeds. Techniques also exist for polarizing glass by means of electric fields. It is well known that two pieces of polarized glass with the planes of polarization parallel are transparent, but with the planes of polarization at ninety degrees are opaque. This principal is used in polarized sunglasses to eliminate glare since reflected light is polarized.

A windshield 12 consisting of two layers in a composite sandwich construction in which one layer is permanently polarized in one plane and the other is polarized electrically in a plane at ninety degrees to the former, can be made alternatively transparent or opaque upon the application of an electric field. In a different embodiment, both layers may be of electrically polarized material in which the planes of polarization are ninety degrees. Other means exist to render transparent materials opaque and although only certain means have been described, this invention can obviously be applied to any such means and is not restricted to the heretofore mentioned methods. It is also obvious that any means 11 of causing opaqueness in the windshield 12 or other glass of an automobile, as a means of preventing or inhibiting theft may be combined with any other deterrent devices 20 such as audible alarms, flashing headlights, etc.

Various prior art references have disclosed systems and methods for rendering a windshield opaque, and these systems and methods are intended to be included within the scope of the present invention. Specifically, U.S. Pat. No. 3,174,398 to Brauner is entitled ANTI-GLARE DEVICE. This reference shows a shade which can be changed at will to as to block the sun or the bright lights of an approaching vehicle, but can also be made fully transparent. In the device, a colored fluid is pumped into a space between two transparent panes, creating a light-filtering screen.

U.S. Pat. No. 3,282,159 to Jones and Friedrich is entitled COLOR REVERSIBLE ELECTROCHEMICAL LIGHT FILTER UTILIZING ELECTROLYTIC SOLUTION. This reference shows two, outside layers of glass surrounding a middle layer of material whose transparency changes with the application of electric current.

U.S. Pat. No. 3,652,149 to Rogers is entitled VARIABLE LIGHT-FILTERING DEVICE WITH A REDOX COMPOUND WHICH FUNCTIONS AS ITS OWN ELECTROLYTE. This reference shows light filters employing redox compounds that are substantially light-transmitting in their oxidized state and capable of forming a stable colored free radical upon the addition of electrons. The colored free radical formed in response to the flow of electrical current renders the device light-absorbing. To restore the original light-transmitting properties, the colored free radical may be readily reoxidized, for example, by reversing the direction of current flow.

U.S. Pat. No. 4,641,922 to Jacob is entitled LIQUID CRYSTAL PANEL SHADE. This reference shows a shading system in which the light transmission characteristics of a liquid crystal panel are varied to produce desired shading effects, useful in an automobile sun visor, where the panel may be a separate element applied against the existing windshield or integrally incorporated into the windshield.

U.S. Pat. No. 4,887,890 to Scherber and Meisel is entitled CONTROLLED TRANSPARENCY. This reference shows a multi-layer construction with two transparent carriers, such as glass, each having a layer of transparent electrode disposed on its internal side, with a transparent electrolyte and an active polymer layer disposed between the electrodes, wherein the active polymer has light absorption properties depending upon the polarity of a voltage applied.

U.S. Pat. No. 4,892,394 to Bidabad is entitled ELECTRONIC SUN SHIELD. This reference shows an electronically operated grid that enables the operator of a motor vehicle to control the shading of their windshield. The device permits individual sections to be darkened to minimize the effects of glare, as driving conditions dictate, or the entire windshield can be darkened, to protect the vehicle interior from the sun when the vehicle is parked.

U.S. Pat. No. 4,893,908 to Wolf, Miller, Shacklette, Elsenbaumer, and Baughman is entitled ADJUSTABLE TINT WINDOW WITH ELECTROCHROMIC CONDUCTIVE POLYMER. This reference shows a conductive polymer cell between transparent window panes, the light transmittance of which can be changed by the application of a potential.

U.S. Pat. No. 4,958,917 to Hashimoto, Inaba, Nakase, and Yanagida is entitled ELECTROCHROMIC DEVICE FOR CONTROLLING TRANSMITTANCE OF LIGHT. This reference shows two superimposed electronic devices, the first taking on color in its charged state and the second taking on color in its uncharged state. Although the devices can share a common electrode, they can be charged separately, to create a variation in shading.

U.S. Pat. No. 5,111,329 to Gajewski, Hymore, and Nietering is entitled SOLAR LOAD REDUCTION PANEL WITH CONTROLLABLE LIGHT TRANSPARENCY. This reference shows a laminated glazing unit of controllable transparency to visible and solar light, and which preferentially excludes infrared rays.

Attempts to defeat such a protection system as that of the present invention by breaking the windshield 12 would draw clear attention to the vehicle, and the likelihood of it being stolen, and would obviously lead law enforcement officers to stop the vehicle and investigate. A further advantage of using such a device would be the significant discount obtained by the owner on vehicle insurance premiums.

The aforementioned invention may be triggered by any of the many presently known or future developed devices to detect unauthorized access to a vehicle and as used on presently available alarms and anti-theft systems.

As an option this device may be triggered manually or automatically upon locking the vehicle serving as a clear warning to potential car thieves that the vehicle is protected and deterring attempts to force entry. In this mode of operation, unauthorized entry would not deactivate the opaque causing mechanism or signal. If all glass is so activated upon leaving the vehicle this information further serves to hide the contents of the interior from potential thieves. Since it is well known that thieves often break into vehicles because they see something that tempts them to steal. This invention provides additional protection in such cases.

A further advantage of this automatic triggering of the opaque glass upon leaving the vehicle is that upon hot days the sunlight does not penetrate to the inside of the vehicle and maintains a much lower temperature. In fact, in the mechanical embodiments of this invention, the film or slats used to render the opaqueness may be silver in the manner of mirrored sunglasses and reflect away sunlight in addition to rendering the windows opaque.

Not only can the device of the present invention protect the automobile and its contents, but there are occasions when the device can assist in protecting the occupants as well. A traveler resting in his or her automobile at a highway rest stop becomes less of a target if they cannot be observed. Likewise, there are occasions where the vehicle can be used for changing clothes, such as at the beach, and the privacy offered by the present invention makes this possible.

It will be obvious to those skilled in the art, that many other permutations and combinations of the aforementioned characteristics of the invention may be combined with other existing art and this invention encompasses such obvious combinations.

Other features, advantages, and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed is:

1. A method to discourage theft of an automobile having a front windshield, which method comprises:

providing said automobile with at least one detection mechanism having at least one detection sensor, each said detection mechanism activatable by unauthorized or forced entry to the automobile;

providing said automobile with means to render the front windshield of said automobile opaque, said means activatable by said detection mechanism;

wherein activation of said detection mechanism by forced or unauthorized entry, will activate said means and render the windshield opaque, effectively preventing operation of said automobile.

2. The method of claim 1, wherein said at least one detection mechanism also activates at least one additional deterrent device.

3. The method of claim 1, wherein said at least one detection mechanism is provided with a plurality of detection sensors.

4. The method of claim 1, wherein there is further provided means to render additional windows of said automobile opaque.

5. The method of claim 4, further comprising the step of rendering additional windows of said automobile opaque.

6. An apparatus to discourage theft of an automobile having a front windshield, which apparatus comprises:

at least one detection mechanism having at least one detection sensor, each said detection mechanism activatable by unauthorized or forced entry to the automobile;

means to render the front windshield of said automobile opaque, said means activatable by said detection mechanism;

wherein activation of said detection mechanism by forced or unauthorized entry, will activate said means and render the windshield opaque, effectively preventing operation of said automobile.

7. A method of claim 6, wherein said at least one detection mechanism also activates at least one additional deterrent device.

8. The apparatus of claim 6, wherein said at least one detection mechanism is provided with a plurality of detection sensors.

9. The apparatus of claim 6, wherein there is further provided means to render additional windows of said automobile opaque.

10. The apparatus of claim 9, wherein additional windows of said automobile may be rendered opaque.

* * * * *